United States Patent
Sandstrom (10) Patent No.: US 10,321,030 B1
(45) Date of Patent: Jun. 11, 2019

(54) SUBMERSIBLE VIDEO CAMERA HOUSING ADAPTED FOR IN-LINE CONNECTION WITH FISHING RIG

(71) Applicant: Thomas Sandstrom, Fort Lauderdale, FL (US)

(72) Inventor: Thomas Sandstrom, Fort Lauderdale, FL (US)

( * ) Notice: Subject to any disclaimer, the term of this patent is extended or adjusted under 35 U.S.C. 154(b) by 0 days.

(21) Appl. No.: 15/689,358

(22) Filed: Aug. 29, 2017

Related U.S. Application Data (63) Continuation of application No. 14/299,626, filed on Jun. 9, 2014, now Pat. No. 9,749,507.

(60) Provisional application No. 61/832,373, filed on Jun. 7, 2013.

(51) Int. Cl.
| | |
|---|---|
| *H04N 7/18* | (2006.01) |
| *H04N 5/225* | (2006.01) |
| *A01K 97/00* | (2006.01) |
| *A01K 91/06* | (2006.01) |
| *G03B 17/08* | (2006.01) |

(52) U.S. Cl.
CPC ........... *H04N 5/2252* (2013.01); *A01K 91/06* (2013.01); *A01K 97/00* (2013.01); *G03B 17/08* (2013.01); *H04N 5/2256* (2013.01)

(58) Field of Classification Search
CPC .... H04N 5/2252; H04N 5/2256; A01K 97/00; A01K 91/06; G03B 17/08
See application file for complete search history.

(56) References Cited

U.S. PATENT DOCUMENTS

| | | | |
|---|---|---|---|
| 2,760,417 | A | 8/1956 | Laval, Jr. |
| 6,091,443 | A | 7/2000 | Forte et al. |
| 6,724,986 | B1 | 4/2004 | Sicher |
| 6,784,920 | B2 | 8/2004 | Weber |
| 8,181,380 | B2 | 5/2012 | Lankinen |
| 9,749,507 | B1 * | 8/2017 | Sandstrom ........... H04N 5/2252 |
| 2003/0174206 | A1 | 9/2003 | Moroz |
| 2005/0200699 | A1 | 9/2005 | Kim |
| 2006/0216007 | A1 * | 9/2006 | Moreb ................... A01K 97/00 396/25 |
| 2008/0289242 | A1 * | 11/2008 | Cecil ...................... A01K 85/16 43/18.1 R |
| 2009/0171146 | A1 * | 7/2009 | Fujita ................. A61B 1/00158 600/102 |
| 2009/0306474 | A1 * | 12/2009 | Wilson .................. A61B 1/041 600/109 |

(Continued)

*Primary Examiner* — Howard D Brown, Jr.
(74) *Attorney, Agent, or Firm* — Mark D. Bowen; Malin Haley DiMaggio & Bowen, P.A.

(57) ABSTRACT

A submersible camera housing specifically configured for use with a portable digital video camera includes a generally bullet-shaped main body having a top, a bottom, a forward end and an open rearward end, and a clear cover removably affixed to the rear end forming a watertight seal with the main body. A battery power source is removably disposed within a battery receiving cavity and electrically connected to a light. A video camera cavity is specifically sized and shaped for receiving a popular digital video camera snugly therein. The clear end cover is adapted for threaded engagement with the read end of the main body and includes an O-ring which forms a watertight seal between the cover and the main body thereby preventing water penetration into the housing interior.

5 Claims, 6 Drawing Sheets

(56) References Cited

U.S. PATENT DOCUMENTS

| | | | | |
|---|---|---|---|---|
| 2011/0018964 A1* | 1/2011 | Krishnan | ............... | G02B 13/06 |
| | | | | 348/36 |
| 2013/0107031 A1* | 5/2013 | Atkinson | ........... | H04N 1/00347 |
| | | | | 348/81 |
| 2013/0289415 A1* | 10/2013 | Koshikawa | ............ | A61B 1/041 |
| | | | | 600/476 |
| 2016/0007581 A1* | 1/2016 | Davidson | ............... | A01K 85/02 |
| | | | | 43/17.1 |

\* cited by examiner

SUBMERSIBLE VIDEO CAMERA HOUSING ADAPTED FOR IN-LINE CONNECTION WITH FISHING RIG

CROSS REFERENCE TO RELATED APPLICATIONS

This application is a continuation of U.S. patent application Ser. No. 14/299,626, filed on Jun. 9, 2014, now U.S. Pat. No. 9,749,507, which claims the benefit of provisional U.S. Patent Application Ser. No. 61/832,373, filed on Jun. 7, 2013.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to housings for photographic and video equipment, and more particularly, to a submersible camera housing for small cameras and video cameras that is adapted for in-line mounting to a fishing rig to capture visual images and video of fish, particularly big game fish, approaching and striking the bait.

2. Description of Related Art

Sport fishing is fishing for pleasure or competition. The most common form of sport fishing is performed by a rood, reel, line, hooks, and any one of a wider variety of baits. Big-game fishing is a form of sport fishing targeting large fish renowned for their sporting qualities, such as tuna and marlin. The approach of a big game fish to a fisherman's bait is a spectacle that most fishermen are unable to observe due to the depth of bait. As a result there has existed a need in the art to enhance the pleasure of sport fishing by providing the fisherman with a video record of the fish taking the bait.

In response to this need, the background art reveals a number of devices intended to allow the fisherman to observe the underwater space in proximity to the hook and bait. U.S. Pat. No. 6,091,443, issued to Ford et al., discloses an underwater viewing system for providing images of an area around an underwater lure. U.S. Pat. No. 6,724,986, issued to Sicher, discloses an underwater camera housing for a waterproof camera that is adapted to hold the camera in either a vertical or a horizontal position. U.S. Pat. No. 6,784,920, issued to Weber, discloses an underwater surveillance apparatus including a watertight housing having a transparent part and a video camera received within the housing. U.S. Pat. No. 8,181,380, issued to Lankinen, discloses an electronic fishing device for facilitating trolling that may be fitted with a host of sensing systems, including a camera. Published Application US 2005/0200699, to Kim, discloses a multi-functional fishing and video system. The Published Application US 2006/0216007, to Moreb, discloses a torpedo-shaped underwater camera-monitor combination wherein a video cable runs from the submerged camera to the monitor. The published application to Laser (US 2008/0148621) discloses a video fishing rod with underwater observation gear that includes a video monitor attached to the fishing pole and a miniature submersible video camera with LED illumination for transmitting video to the monitor.

The various devices revealed in the background art are all burdened by a number of limitations and disadvantages including complex wiring, poor lighting, requirement for vessel power, the use of additional cables, and inadequate positioning relative to the hook/bait.

BRIEF SUMMARY OF THE INVENTION

The present invention overcomes the limitations and disadvantages present in the art by providing a submersible camera housing specifically configured for use with a portable digital video camera. The housing includes a generally bullet-shaped main body having a top, a bottom, a forward end and an open rearward end, and a clear cover removably affixed to the rear end forming a watertight seal with the main body. The main body is substantially hollow and specifically configured to define a plurality of cavity sections including a battery receiving cavity disposed in proximity to the forward end, a video camera receiving cavity disposed rearward relative to the battery receiving cavity, and a light receiving cavity disposed above and generally adjacent to the video camera cavity. A battery power source is removably disposed within the battery receiving cavity and electrically connected to light activating conductor received within the light receiving cavity, and a light is disposed in generally axial alignment therewith and spring biased to a non-energized or "off" position. Installation of the rear cover functions to urge the light into electrical contact with the conductor thereby energizing the light source. The video camera cavity is specifically sized and shaped for receiving a popular digital video camera snugly therein. The clear end cover is adapted for threaded engagement with the read end of the main body and includes an O-ring which forms a watertight seal between the cover and the main body thereby preventing water penetration into the housing interior. A suitable fishing leader or cable projects axially from the front end of the main body for connection to the fishing line leading to a fishing pole, and fishing leader or cable projects axially from the clear cover for connection to the fishing rig which may comprise one or more lines, hoods, swivels, lures, or other fishing tackle. The present invention thus allows for the in-line positioning of a video camera and illumination source directed to the fishing rig so as to record the activity and catching of big game fish.

Accordingly, it is an object of the present invention to provide advancements in the field of underwater imaging.

Another object of the present invention is to provide a submersible video camera housing adapted for in-line connection with a downstream fishing rig.

Still another object of the present invention is to provide such a housing adapted to contain a battery power source, a light source, and a video camera in a snug secure waterproof environment.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Turning now to the drawings, FIGS. 1-8 depict a preferred embodiment of a submersible, in-line mounted, housing, generally referenced as 10, for housing a video camera and illumination assembly in accordance with the present invention. Submersible camera housing 10 is specifically configured for use with a portable digital video camera to provide a waterproof enclosure for the video camera. In accordance with a preferred embodiment, housing 10, is adapted for use with a GOPRO® brand digital video camera. GOPRO® is a trademark of Woodman Labs, Inc. of San Mateo Calif. Housing 10 defines a generally bullet-shaped main body 12 having a top 14, a bottom 15, a forward 16 end and an open rearward end 17. More particularly, housing 10 includes a generally cylindrical main body 12, having a convex forward end 16. A transparent, generally planar, circular cover 20 is adapted for removable connection to main body 12 to provide a watertight closure in covering relation with open rear end 17. Cover 20 may connect to main body 12 by threaded connection, press fit, snap fit, twist lock, or any other suitable means of mechanical connection. Cover 20 further includes an O-ring 21 circumferentially disposed thereon that forms a watertight seal with the open end 17 or main body 12. Main body 12 is preferably fabricated from a suitable plastic material, such as PVC or DELRIN®. Cover 20 is preferably fabricated from clear Acrylic or Lucite material, or any other suitable transparent material. Housing 10 is capable of maintaining watertight integrity to a submerged depth of at least 5,000 feet.

Figure 1:
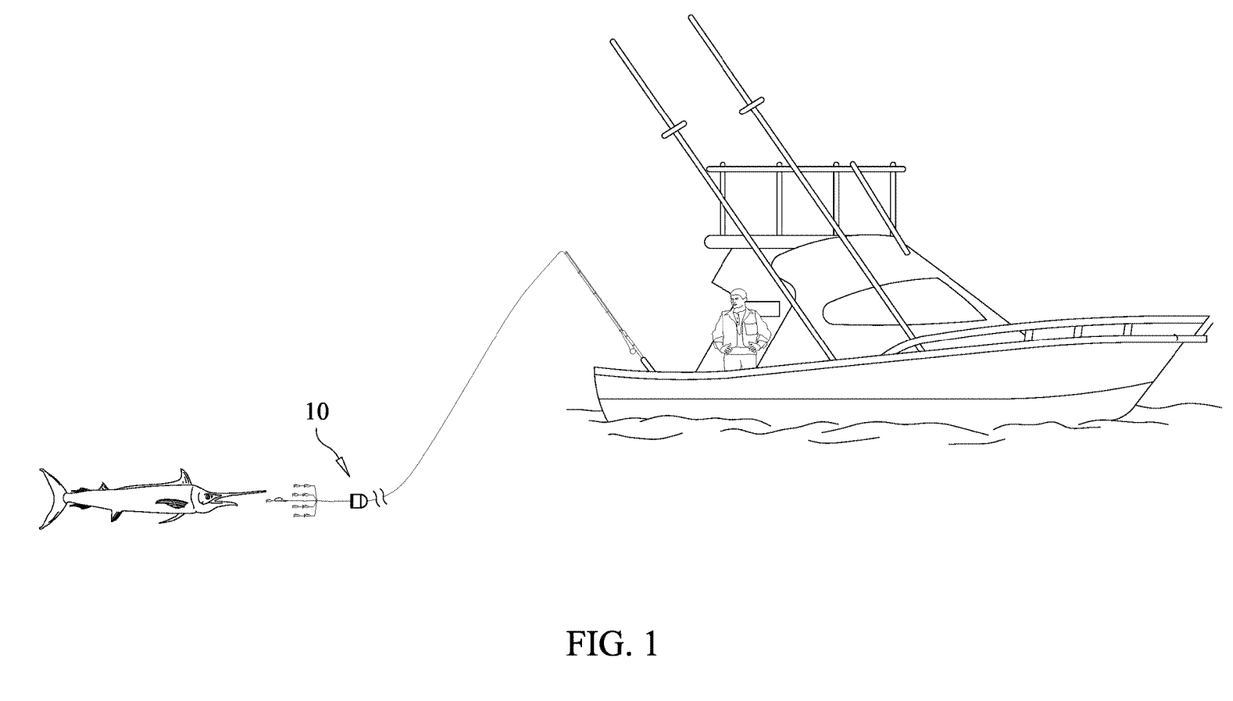
FIG. 1 is an illustration of a submersible in-line mounted camera housing in use while sport fishing accordance with the present invention.
Figure 2:
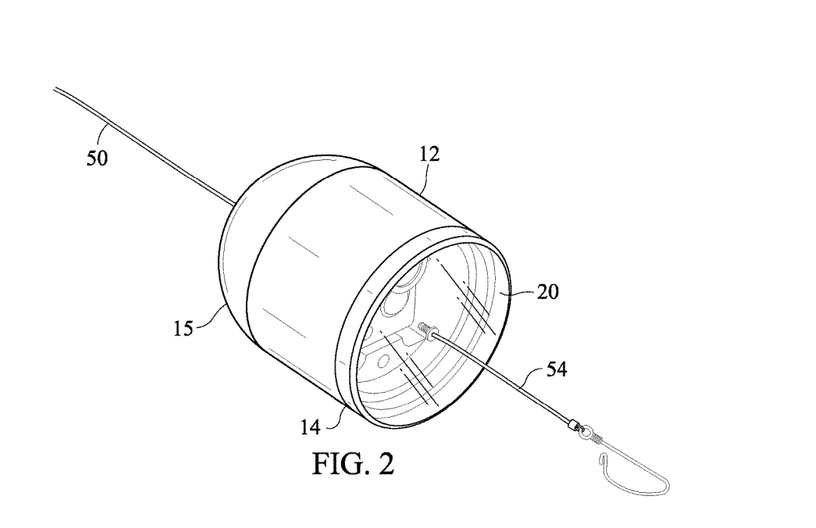
FIG. 2 is rear perspective view of the camera housing.
Figure 3:
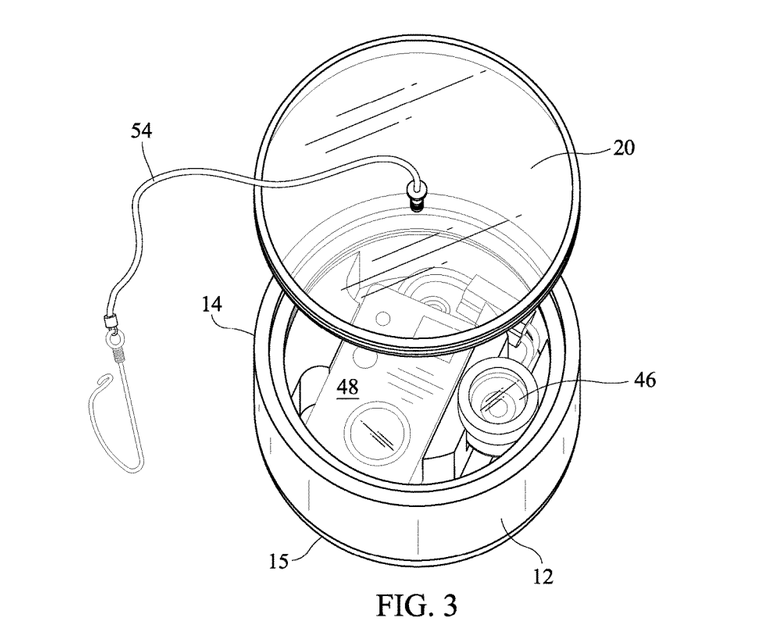
FIG. 3 is a rear view thereof with the cover exploded.
Figure 4:
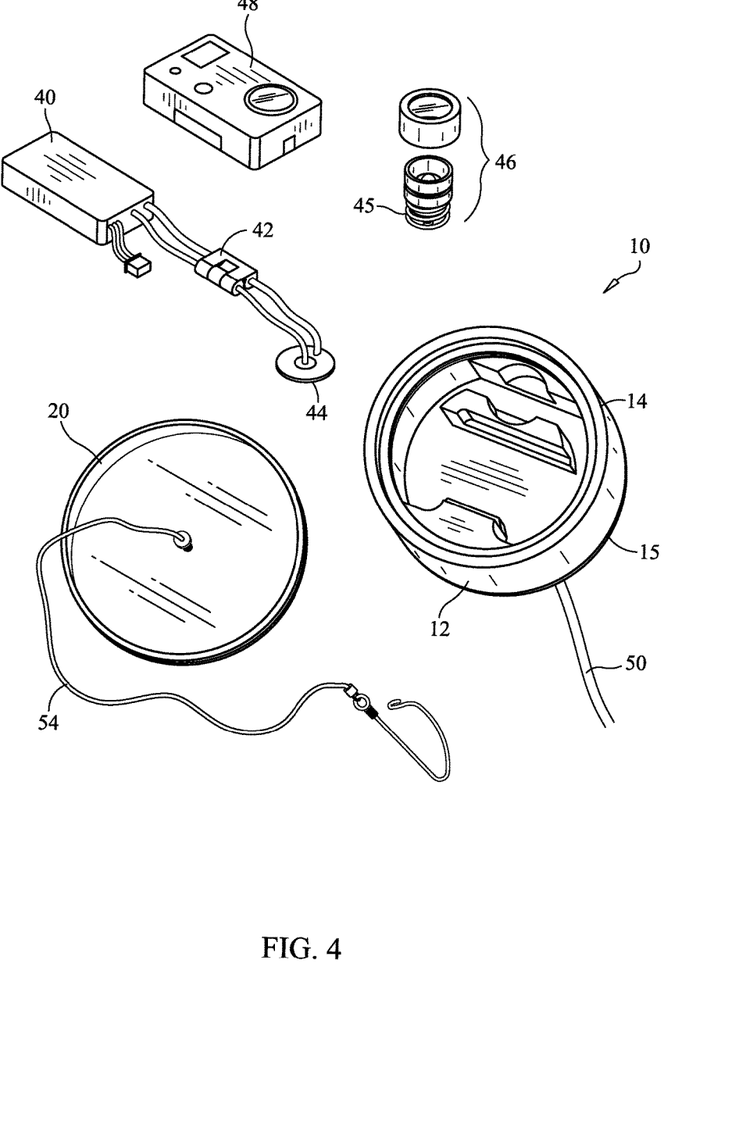
FIG. 4 is a rear exploded view of the camera housing, illumination components, and video camera.
Figure 5:
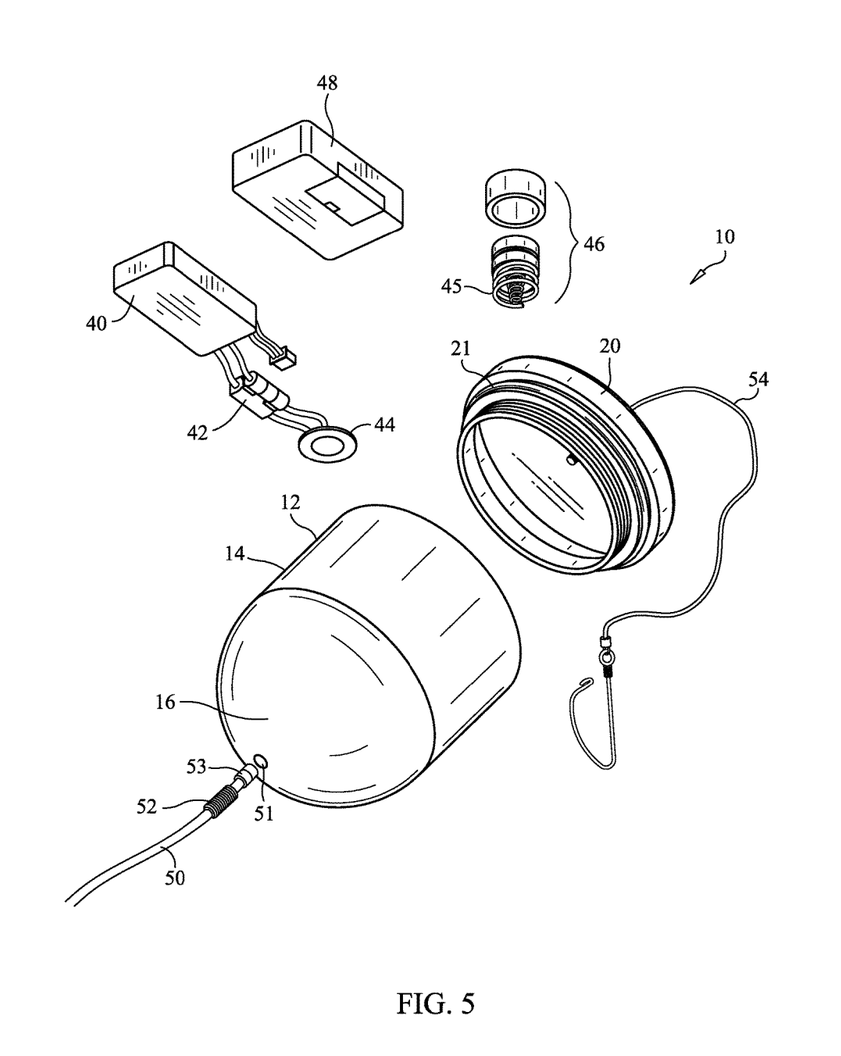
FIG. 5 is a front exploded view thereof.
Figure 6:
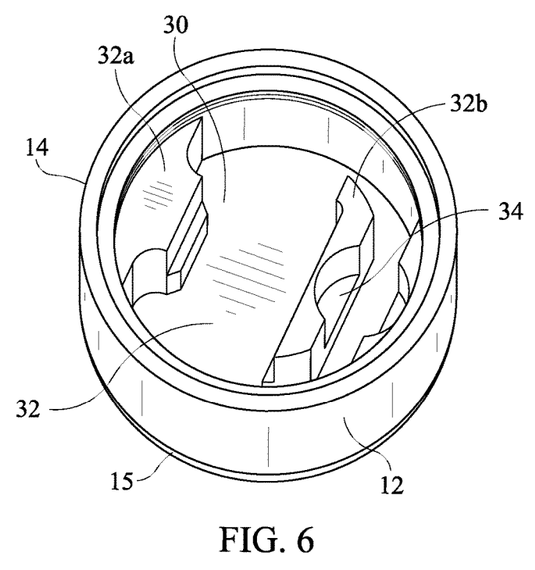
FIG. 6 is a view into the interior of the main body.
Figure 7:
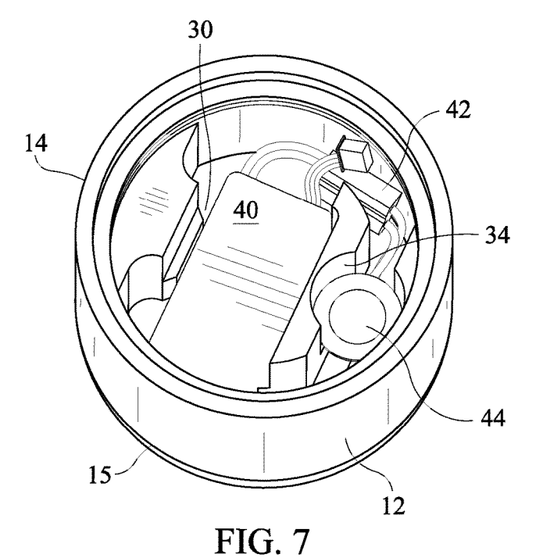
FIG. 7 is a view into the interior of the main body with the battery pack installed.

As best illustrated in FIGS. 4 and 6, main body 12 is substantially hollow and specifically configured to define a plurality of cavity sections including a first or battery receiving cavity 30 disposed in proximity to the forward end, a second or video camera receiving cavity 32 disposed rearward relative to the battery receiving cavity 30, and a third or light receiving cavity 34 disposed above and generally adjacent to video camera cavity 32. As best seen in FIG. 4, a battery power source 40 is removably disposed within the battery receiving cavity 30. As further illustrated in FIGS. 7 and 8, battery power source 40 includes an electrically conducting cable or conductor 42 connected to a conducting electrical contact plate 44 disposed within the light receiving cavity 34. A light 46 is also disposed within cavity 34 in generally axial alignment with conducting plate 44 and is spring biased to a non-energized position by a spring 45 (shown in FIGS. 4 and 8). Spring 45 functions to bias light 46 away from conducting plate 44 when cover 20 is removed. Conversely, threaded engagement of cover 20 causes the inner surface thereof to engage light 46 and compress spring 45 as the cover is screwed-on, such that light 46 retracts into electrical contact with conducting plate 44 thereby placing light 46 in electrical communication with battery power source 40 and energizing the light. Accordingly, installation of cover 20 functions to energize light 46 and removal of cover 20 functions to de-energize light 46.

Figure 8:
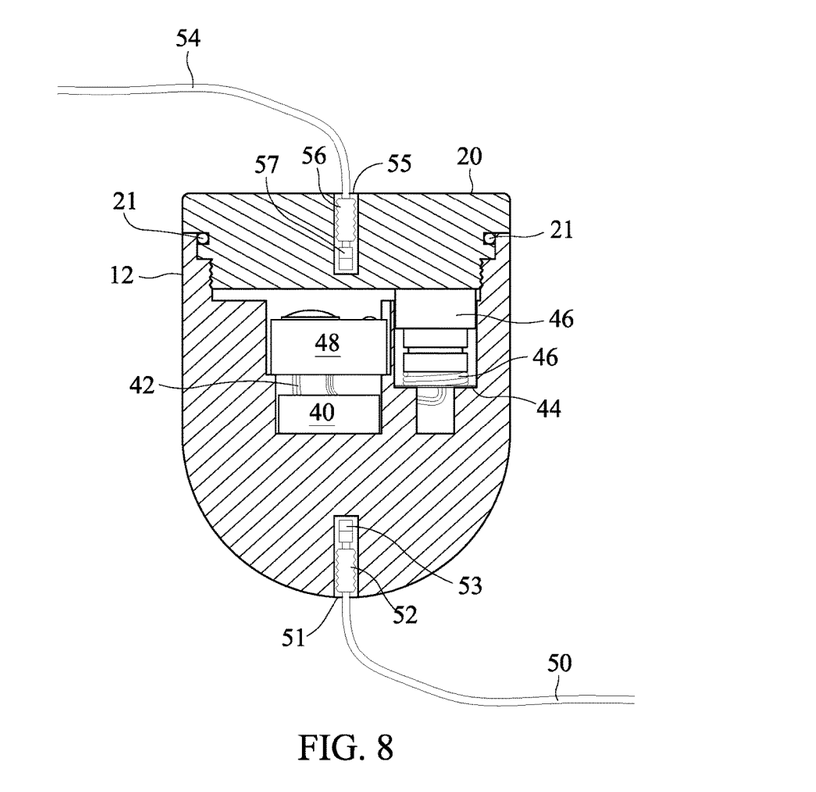
FIG. 8 is a side sectional view of the fully assembled main body with illumination components, video camera, and the clear cover in threaded engagement with the main body.

FIG. 8 illustrates installation of a video camera 48 within video camera cavity 32. As noted above, cavity 32 is bounded by projecting structures, generally referenced as 32A and 32B, which function to snugly secure video camera 48 within cavity 32. Accordingly, it is important that cavity 32 be specifically sized and shaped for receiving a digital video camera snugly therein, and preferably in frictional engagement, so as to prevent the camera from shaking while in use. As should be apparent, video camera 48 is installed with the lens thereof facing the open rearward end 17 of main body 12, and is further oriented with the top thereof disposed adjacent to light 46. It is important to have light 46 disposed above camera 48 for providing illumination from above which better simulates natural illumination provided by the sun. Further, video camera 48 should be manually activated (e.g. record mode turned "on") prior to insertion within housing 10 whereby the camera is capable of uninterrupted recording for several hours. Camera 48 will thus record continuously until either its battery power supply is depleted, or its memory is full, or the user retrieves the housing and removes the camera.

A further significant aspect of the present invention involves providing a submersible camera housing that may be mounted for fishing in an in-line configuration thereby maximizing the ability of the housing to maintain the fishing rig (e.g. baited hook(s) and/or lure(s)) within the camera's field of view. In accordance with this aspect of the present invention fishing leader segments (e.g. wire, fishing line, or cable) extend generally axially from both the front end 16 of main body 12, and axially from cover 20. The term "leader" shall broadly be construed to mean a flexible wire, cable or line of the type used in the art of fishing. More particularly, a first leader 50 is connected to the front end 16 of main body 12. An axial bore 51 is formed at the front end 16 and receives a vented set screw 52 through which the end portion of leader 50 is inserted and secured by a barrel crimp 53. The set screw functions to anchor leader 50 to the front end 16 of housing 12. As should be apparent, leader 50 is attached to fishing line spooled on a fishing reel onboard a fishing vessel. Similarly, a second leader 54 is connected to cover 20. Cover 20 defines an axial bore 55 on the exterior surface thereof which receives a vented set screw 56 through which the end portion of leader 54 is inserted and secured by a barrel crimp 57. Housing 10 is preferably positioned approximately 5-15 feet from the bait/lure. The present invention thus allows for the in-line positioning of a video camera and illumination source directed to the fishing rig so as to record the activity and catching of fish.

Finally, cover 20 may be adapted with a water temperature indicator. In a preferred embodiment, cover 20 may be adapted with water temperature tape, referenced as 60 in FIG. 8. Water temperature tape is preferably affixed to the exterior surface of cover 20 within the field of view of camera 48 and positioned to minimize line of sight obstruction with the rig attached to leader 54. Water temperature tape thus displays the water temperature in a manner that is recorded by video camera 48. When in use, housing 10 may be configured generally horizontally (as when trolling) or generally vertically downward (deep drop fishing).

Alternate Embodiment

Figure 9:
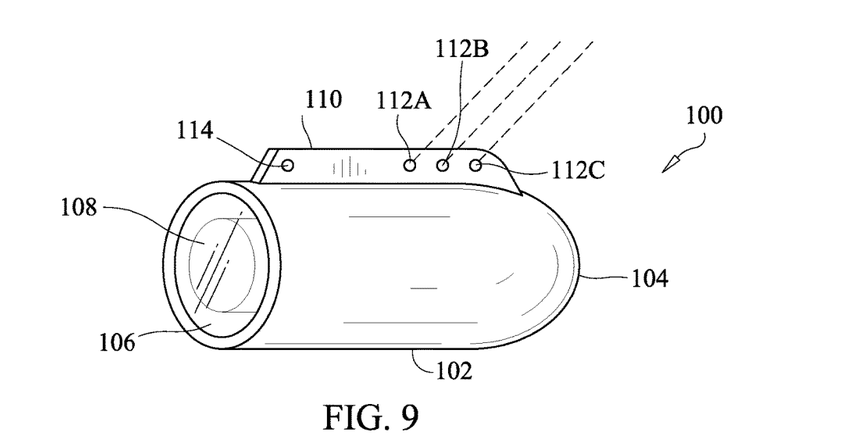
FIG. 9 depicts an alternate embodiment submerged video camera housing.

FIG. 9 depicts an alternate embodiment video camera housing, generally referenced as 100. Alternate housing 100 includes a generally bullet-shaped main body 102 having a forward 104 end and an open rearward end 106, and a clear cover 108 adapted for threaded engagement with the open rear end 106 of main body 102. Cover 108 further includes an O-ring that forms a watertight seal with the main body. Main body 102 is preferably fabricated from a suitable plastic material, such as PVC or DELRIN®. Cover 108 is preferably fabricated from clear Acrylic or Lucite material, or any other suitable transparent material. Housing 100 is capable of maintaining watertight integrity to a submerged depth of at least 5,000 feet. A longitudinally disposed flange 110 projects from the outer surface of housing 100. Flange 110 includes a front portion defining a plurality of apertures, referenced as 112A, 112B, and 112C, and a rear portion defining a single aperture 114. The main line from a fishing pole is secured to one of apertures 112A-C, and a leader is affixed to aperture 114. A video camera is maintained within housing 112 during use.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A submersible camera housing configured for use with a portable digital video camera for in-line recording of images while fishing, said camera housing comprising:
   a generally cylindrical main body having a top, a bottom, a forward end and an open rear end, said main body being substantially hollow;
   a video camera disposed within said main body and disposed with a field of view looking out the rear end of said main body;
   a light disposed within said main body and positioned above said video camera to illuminate said field of view from above said video camera;
   a battery power source disposed within said cavity;
   a transparent cover configured for removable watertight connection with said open rear end of said main body;
   said battery power source placed in electrical communication with said light by installation of said cover thereby activating said light, and said battery power source removed from electrical communication with said light by removal of said cover; and
   whereby said light provides illumination through said transparent cover from a position disposed above said video camera.

2. The submersible camera housing according to claim 1, further including a leader connected to the forward end of said housing.

3. The submersible camera housing according to claim 1, further including a leader connected to said cover.

4. A submersible camera housing configured for use with a portable digital video camera for in-line recording of images while fishing, said camera housing comprising:
   a generally cylindrical main body having a top, a bottom, a forward end and an open rear end, said main body being substantially hollow;
   a video camera disposed within said main body and disposed with a field of view looking out the rear end of said main body;
   a light disposed within said main body and positioned above said video camera;
   a battery power source disposed within said cavity;
   a transparent cover configured for removable watertight connection with the rear end of said main body, and wherein connection of said transparent cover places said battery power source in electrical communication with said light thereby activating said light, and wherein removal of said transparent cover remove electrical communication between said battery power source and said light;
   said transparent cover being removably secured in covering relation the open end of said maid body by threaded engagement; and
   whereby said light provides illumination through said transparent cover from a position disposed above said video camera.

5. The submersible camera housing according to claim 4, wherein said battery cavity section is disposed within said main body forward relative to said camera cavity section.

* * * * *